United States Patent [19]

Hamsag

[11] 4,240,197
[45] Dec. 23, 1980

[54] METHOD FOR SEALING A PRIMARY CELL

[75] Inventor: Ernest E. Hamsag, Chêne-Bougeries, Switzerland

[73] Assignee: Saft-Societe des Accumulateurs Fixes et de Traction, Romainville, France

[21] Appl. No.: 931,005

[22] Filed: Aug. 4, 1978

[30] Foreign Application Priority Data

Aug. 8, 1977 [CH] Switzerland ............ 9717/77

[51] Int. Cl.³ ............................................. H01M 2/04
[52] U.S. Cl. .................................. 29/623.2; 29/507;
429/174; 220/66
[58] Field of Search .............. 29/623.2, 623.1, 507, 29/512, 521; 429/171–174, 185; 220/66, 67; 113/1 E, 120 Y

[56] References Cited

U.S. PATENT DOCUMENTS

| 1,921,021 | 8/1933 | Bungay | 29/507 |
|---|---|---|---|
| 1,976,673 | 10/1934 | Titus | 29/512 |
| 2,664,609 | 1/1954 | Kellems | 29/507 |
| 2,683,559 | 7/1954 | Staller | 113/1 E |
| 2,905,124 | 9/1959 | Henchert | 29/512 |
| 3,068,313 | 12/1962 | Daley | 429/174 |
| 3,069,489 | 12/1962 | Carmichael et al. | 429/174 |
| 3,343,996 | 9/1967 | Micksch et al. | 220/67 |
| 3,671,060 | 6/1972 | Kyburz | 29/507 |
| 3,757,717 | 9/1973 | Bennett | 113/1 E |
| 3,791,873 | 2/1974 | Angelovich | 429/174 |
| 4,100,869 | 7/1978 | Gross | 113/120 Y |

FOREIGN PATENT DOCUMENTS 64641 7/1946 Denmark ...................... 29/507

Primary Examiner—Daniel C. Crane
Attorney, Agent, or Firm—Kenyon & Kenyon

[57] ABSTRACT

A sealed primary cell includes a metal receptacle (1), a metal cover (2) which closes the receptacle and a hard and resilient thermoplastic sealing ring (3) which may optionally be coated with a softer material (not shown). The sealing ring (3) is inserted between the cover (2) and the internal wall of the receptacle (1) and is radially compressed between the cover (2) and the receptacle (1). The invention is characterized in that the radial compression of the sealing ring (3) is achieved by radially outward deformation of the outer edge of the cover, e.g. by an auricular portion of a tool (7) enlarging a U-shaped peripheral rim of the cover. FIG. 2 shows the cell held in a die (9) after the sealing ring (3) has been radially compressed by the tool (7) but before the cell is finished by the usual inward crimping of the upper rim of the receptacle (1).

8 Claims, 10 Drawing Figures

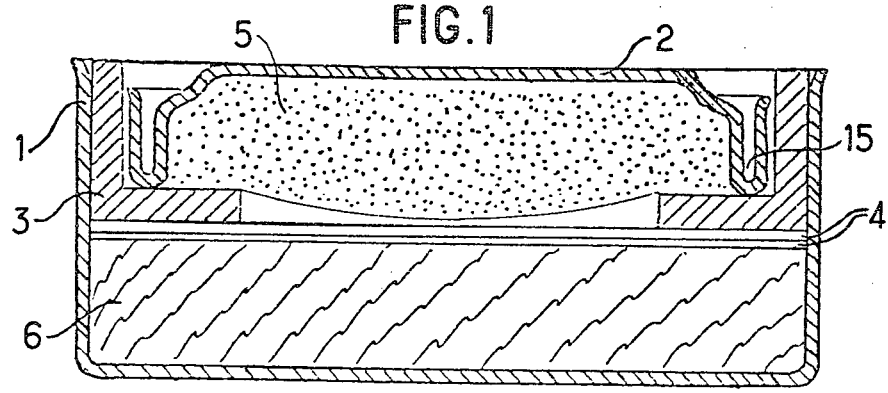
FIG. 1
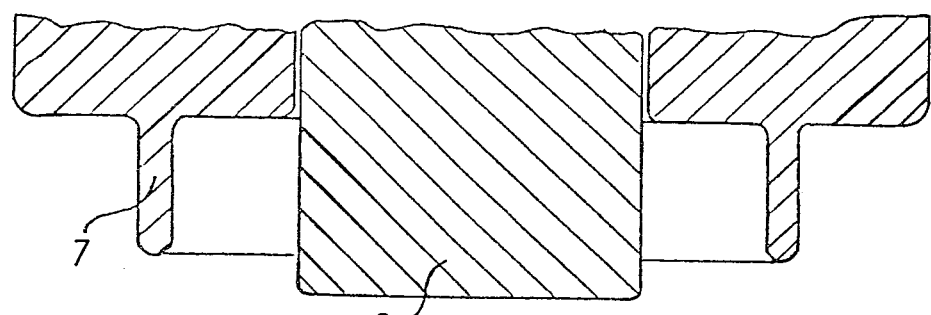
FIG. 2
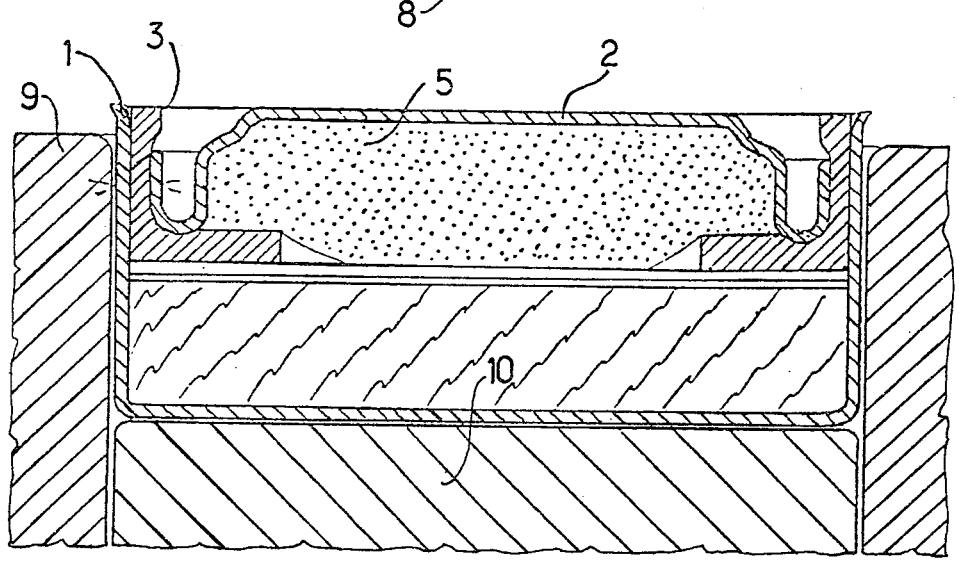

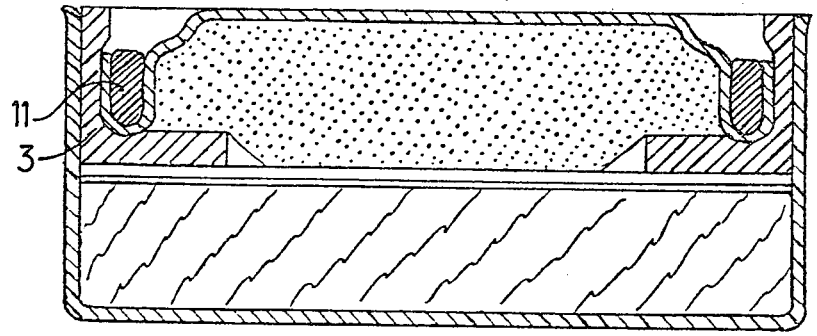
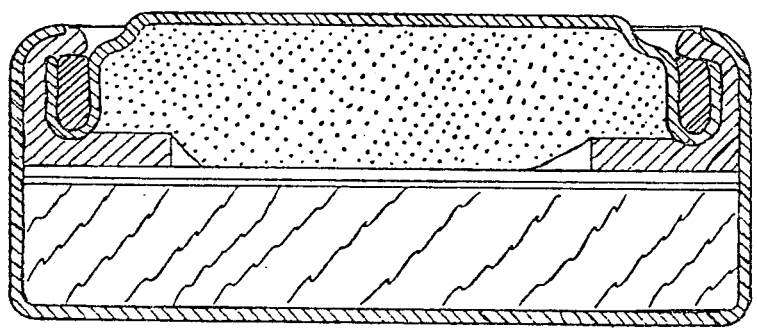
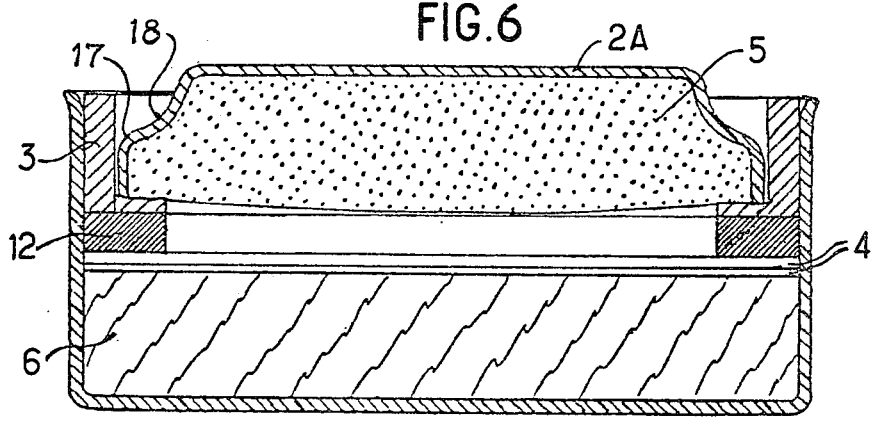

4,240,197

METHOD FOR SEALING A PRIMARY CELL

The present invention relates to a sealed primary cell, for example an alkaline electrolyte cell.

It has always been very difficult to manufacture cells which are completely sealed, firstly because corrosion of the active components of the anode causes hydrogen to be evolved and thus creates high pressure inside the cell, and secondly because the alkaline electrolyte has high wetting power and has a great tendency to creep along metal surfaces; hence the electrolyte seeps out.

To improve sealing, it is known to use specially shaped covers having several parts and in some cases to mould a sealing ring onto the cover. It is also known to form resilient surface compression zones on the surfaces of the sealing ring and of the cover.

An effective solution has been proposed in Swiss Pat. No. 361600 (priority:19th Nov., 1958) which describes a cell which includes a metal receptacle, a metal cover which closes said receptacle and a sealing ring made of a thermoplastic material inserted between said cover and the internal wall of the receptacle, said cell being characterized in that the sealing ring is made of a hard thermoplastic material and in that the sealing ring is compressed radially between the cover and the wall of the receptacle. The sealing ring is compressed radially by pushing the receptacle with the ring and the cover through a die, thus reducing the outside diameter. In accordance with the said patent, a compression force is thus obtained which is at least substantially equal to the elastic limit of the metal which forms the wall of the receptacle but which is lower than the breaking point of the wall.

The disadvantage of this method, in particular for button-type cells, is that reducing the diameter of the receptacle disturbs the inside of the cell, in particular the separators which become creased and the cathode which cracks.

Another Swiss Pat. No. 359759 filed on the same date as the previously mentioned patent, uses, besides radial compression, a compound sealing ring made of a hard synthetic material which withstands cold flow, at least a part of its surface being coated with a softer material which is not damaged by the electrolyte contained in the cell.

The present invention returns to the idea in Swiss Pat. No. 361600 of radially compressing the sealing zone but with a completely different method which obviates the disadvantage of the method of the said Swiss patent.

The sealed primary cell in accordance with the present invention includes a metal receptacle, a metal cover which closes said receptacle and a sealing ring made of a hard synthetic material which withstands cold flow, optionally coated with a softer material which is not damaged by the electrolyte contained in the cell, the sealing ring being inserted between the cover and the internal wall of the receptacle; it is characterized in that the sealing ring is compressed radially between the wall and the cover so that the external wall is not deformed beyond its elastic deformation point and in that the compression is obtained by radial defomation of the cylindrical wall of the cover, the deformation being directed outwards.

Embodiments of the invention are described hereinbelow with reference to the accompanying drawings in which:

FIG. 1 shows schematically a greatly enlarged cross-section of an assembled but not yet sealed button-type primary cell.

FIG. 2 shows schematically a greatly enlarged cross-section of a partial view of the tooling for separating the edges of the cover and of the cell inside the tooling after operation;

FIG. 3 shows schematically a greatly enlarged cross-section of an annular part which, when inserted between the inside edge and outside edge of the cover, consolidates these edges;

FIG. 4 shows schematically a greatly enlarged cross-section of a cell fitted with the annular part of FIG. 3;

FIG. 5 shows schematically a greatly enlarged cross-section of the cell of FIG. 4, but after crimping;

Figure 7:
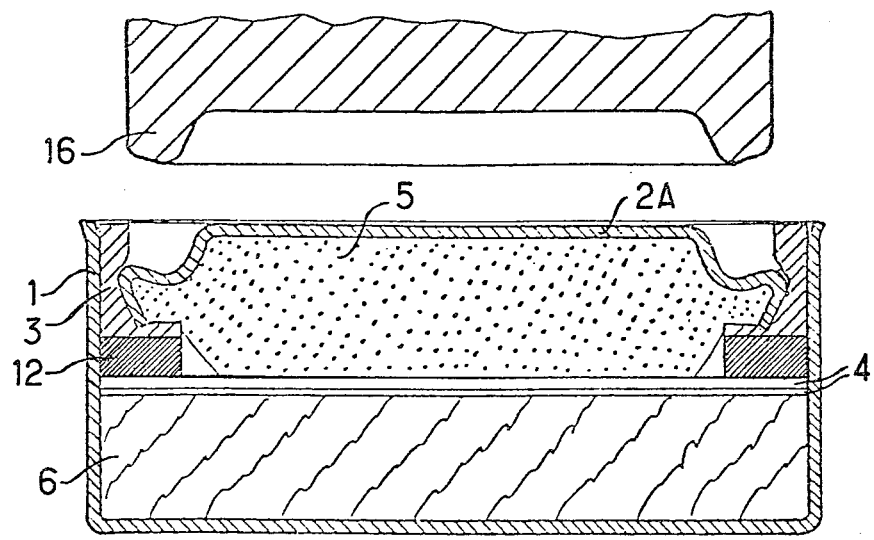
Figure 8:
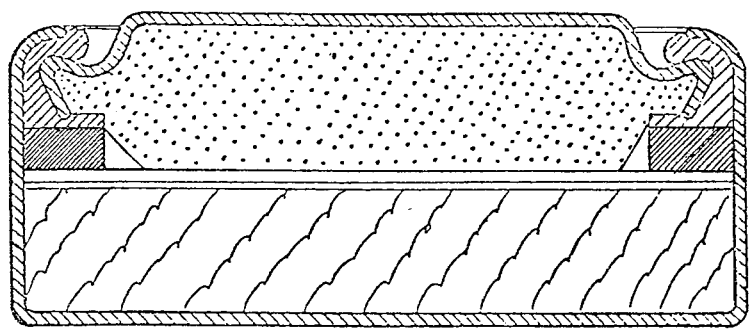
Figure 9:
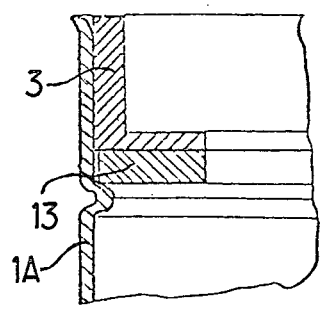
Figure 10:
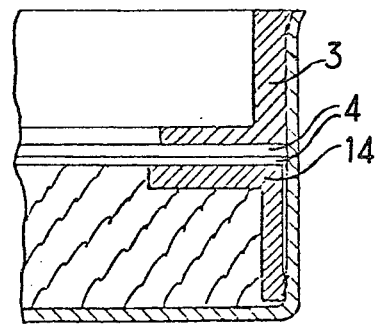

FIG. 6 schematically shows a greatly enlarged cross-section of a cell analogous to the one in FIGS. 1 to 5, but with another type of cover;

FIG. 7 shows schematically a greatly enlarged cross-section of the cell of FIG. 6, but after the sealing operation. It also shows a partial view of a cross-section of the tool used for this operation;

FIG. 8 shows schematically a greatly enlarged cross-section of the cell of FIGS. 6 and 7, but after crimping;

FIG. 9 shows schematically a partial view of a partially assembled cell, showing how the cover is accommodated in accordance with a variant structure of a cylindrical alkaline type cell; and FIG. 10 shows schematically a partial view of a greatly enlarged cross-section of a button-type cell with a slightly different structure to those in FIGS. 1 to 8.

Now, with reference to the drawings, in which the reference numerals designate the same parts in all the figures, the primary cell illustrated includes a metal receptacle 1 made of nickel-plated steel or nickel-chromium stainless steel or steel with a high nickel content, a cap which is referred to here as a cover 2 made of copper-gold plated stainless steel or of a laminated strip of stainless steel and copper which may optionally be gold plated, a sealing ring 3 made of hard nylon or of another plastics material which withstands cold flow, which is optionally coated with a softer layer, a cathode 6 made of silver oxide, mercury oxide, manganese oxide or any other suitable oxidizing material in compact form, an anode 5 which is contained in the cover during assembly and which is constituted by powdered zinc amalgam, electrolyte (sodium hydroxide or potassium hydroxide) gelled by means of a gelling agent, and two or more separators 4.

Schematic drawings of two types of cover show how a cell in accordance with the invention is sealed; these drawings illustrate two types of cover and two different ways of pushing the outside edges of the covers against the wall of the receptacle and of thus compressing the sealing ring.

In FIGS. 1 to 5, a cover is used whose outer edge is folded back to form a U, 15. This folded edge can be pushed outwards by means of a tool 7 illustrated in FIG. 2. In this case, the assembled cell is in a die 9 and is supported by an adjustable piston 10 which will also act as an ejector at the end of the operation. The tool 7 has an annular portion which is driven downwards by a press and pushes one leg of the U 15 away from the edge of the cover 2, while a piston 8 slides inside the tool 7 to exert a small pressure on the cover to keep it in position. This operation can be split into several phases if necessary, using successive tools 7 of increasing outside diameter. In the case of cells with a diameter of about 11.5 mm, the edge will be moved outwards by 0.2 to 0.4 mm. To consolidate the bent back edge, a ring 11 made, for example, of stainless steel (shown in FIG. 3) can be inserted in the U as shown in FIG. 4. It can also be envisaged to seal a cell such as shown in FIG. 1 in a single phase while driving a ring similar to that of FIG. 3 into the U 15 at the edge of the cover 2. The final shape of the cell, obtained by the usual crimping operation, is shown in FIG. 5.

In FIGS. 6 to 8, a cover 2A is used which has an edge that is not folded in a U shape, but the shape of the cover is such that driving the cover into the receptacle with the tool 16 of FIG. 7 pushes back the edge of the cover. There is a position, in which the tool pushes the cover back by a maximum amount; in FIGS. 7 and 8, this position is slightly exceeded; this not only stabilizes the cover but also, in the case of chemical reaction inside the cell where gas is evolved and hence in the case of increasing internal pressure, the cover tends to be pushed back towards the maximum position and thus increases sealing by increased radial pressure. A metal ring 12, made of cooper, for example, supports the seal during the operation illustrated in FIG. 7. A similar ring can also be used in the case of the solution disclosed in FIGS. 1 to 5. In the two solutions which correspond to the two forms of cover, the sealing ring could alternatively be supported by an inverted L-shaped metal ring 14 (FIG. 10) (made of nickel-plated steel, for example) incorporated in the cathode.

The two solutions can also be applied to cylindrical cells larger than button-type cells, such as standard alkaline cells. FIG. 9 shows the metal receptacle 1a of such a cell having a bearing and support ring 13.

In this case, the current collector used in this type of cell must be riveted or welded on the cover 2 or 2a, not shown in FIG. 9, before its insertion into the receptacle.

I claim:

1. A method of sealing a primary cell assembly which includes a cylindrical metal receptacle having an open end and a closed end, a sheet metal cover positioned within the open end of the receptacle, the cover having an axially extending deformed portion adjacent to a peripheral part of the cover and a hard resilient thermoplastic sealing ring positioned between the periphery of the cover and the inner side of the cylindrical wall of the receptacle, said cover being positioned in said receptacle so that a surface of the cover is exposed, the method comprising:
    pressing a tool against the exposed surface of the cover of the primary cell assembly, the tool having a contacting surface which contacts part of the axially extending deformed portion of the cover;
    moving the contacting surface of the tool axially toward the closed end of the receptacle, the axial movement of the contacting surface against the contacted part of the cover causing radially outward deformation of the peripheral part of said cover to radially compress said sealing ring against the inner side of the wall of the cylindrical receptacle; and
    preventing inelastic radially outward deformation of the wall of the cylindrical receptacle during said axial movement of the tool.

2. A method of sealing a primary cell assembly according to claim 1, wherein the contacted part of the axially deformed portion of the cover includes the inner surface of an axially outwardly turned annular wall, and the contacting surface of the tool is an annular surface having an outer diameter greater than the inner diameter of said axially outwardly turned annular wall, and wherein the annular surface of the tool slides against the contacted radially inward facing surface of the axially outwardly turned annular wall during said axial movement of the contacting surface toward the closed end of the receptacle, thereby outwardly expanding said axially outwardly turned annular wall.

3. A method of sealing a primary cell assembly according to claim 2, further comprising repeating said steps of pressing a tool against the cover and axially moving a contacting surface of the tool toward the closed end of the receptacle by using successive tools having annular contacting surfaces with progressively larger outer diameters.

4. A method of sealing a primary cell assembly which includes a cylindrical metal receptacle having an open end and a closed end, a sheet metal cover positioned within the open end of the receptacle, said cover being positioned in said receptacle so that a portion of the cover forms an outer surface of the cell assembly, the cover having an axially deformed portion adjacent to a peripheral part of the cover, wherein the axially deformed portion of the cover is turned axially inwardly and folded back to form a U-shaped peripheral channel opening outwardly from the receptacle with the U-shaped peripheral channel having a radially inwardly facing surface, and a hard resilient thermoplastic sealing ring positioned between the periphery of the cover and the inner side of the cylindrical wall of the receptacle, the method comprising:
    pressing a tool against the outer surface of the cover of the primary cell assembly, the tool having a contacting surface which contacts part of the axially deformed portion of the cover, the contacting surface of the tool being an annular surface having an outer diameter greater than the inner diameter of the outer folded back wall of said U-shaped channel, and
    moving the contacting surface of the tool axially toward the closed end of the receptacle such that the annular contacting surface of the tool slides against the contacted radially inward facing surface of the folded back wall of the channel during said axial movement of the contacting surface toward the closed end of the receptacle, thereby radially outwardly deforming said folded back wall to radially compress said sealing ring against the inner side of the wall of the cylindrical receptacle.

5. A method of sealing a primary cell assembly according to claim 4, wherein said tool comprises a nondeformable ring which is driven into the U-shaped channel by said axial movement.

6. A method of sealing a primary cell assembly according to claim 1 or 4, further comprising the step of inserting a nondeformable ring into a portion of the cover deformed by said contacting surface of the tool.

7. A method of sealing a primary cell assembly which includes a cylindrical metal receptacle having an open end and a closed end, a sheet metal cover positioned within the open end of the receptacle, said cover being positioned in said receptacle so that a portion of the cover forms an outer surface of the cell assembly, the cover having an axially deformed portion adjacent to a peripheral part of the cover, said axially deformed portion including a slanting annular wall having an axially outward part, and a hard resilient thermoplastic sealing ring positioned between the periphery of the cover and the inner side of the cylindrical wall of the receptacle, the method comprising:

pressing a tool against the outer surface of the cover of the primary cell assembly, the tool having a contacting surface which contacts part of the axially deformed portion of the cover, wherein the contacted part of the axially deformed portion of the cover includes the axially outward part of the slanting annular wall;

moving the contacting surface of the tool axially toward the closed end of the receptacle such that the axial movement of the contacting surface of the tool toward the closed end of the receptacle displaces the axially outward part of said slanting wall axially with respect to the axially inward part of said slanting wall thereby radially outwardly deforming the adjacent peripheral part of the cover to radially compress said sealing ring against the inner side of the wall of the cylindrical receptacle; and preventing inelastic radially outward deformation of the cylindrical wall of said receptacle during said axial movement of the tool.

8. A method of sealing a primary cell assembly according to claim 7, wherein said slanting annular wall extends axially inwardly and radially outwardly between the central portion of the cover and the peripheral part of the cover, and wherein the axially outward part of the slanting wall is displaced axially with respect to the axially inward part of said slanting wall beyond a position at which said peripheral part of the cover is expanded to its maximum radially outward extent, whereby internal pressure developed in the sealed cell tends to displace the cover axially away from the closed end of the receptacle toward said position of maximum peripheral expansion.

* * * * *